(12) United States Patent  
Gurevich et al.

(10) Patent No.: US 7,726,573 B2  
(45) Date of Patent: Jun. 1, 2010

(54) COMPACT AUTOFOCUS BAR CODE READER WITH MOVING MIRROR

(75) Inventors: Vladimir Gurevich, Stony Brook, NY (US); Igor Vinogradov, New York, NY (US); Tsi David Shi, Stony Brook, NY (US); Duanfeng He, South Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 327 days.

(21) Appl. No.: 11/753,628

(22) Filed: May 25, 2007

(65) Prior Publication Data

US 2008/0290169 A1    Nov. 27, 2008

(51) Int. Cl.  
  *G06K 7/10* (2006.01)
(52) U.S. Cl. ............. 235/462.23; 235/454; 235/462.01; 235/462.2; 235/462.24; 235/462.32
(58) Field of Classification Search ................. 235/454, 235/462.01, 462.2, 462.21, 462.23, 462.24, 235/462.32, 462.36, 472.01; 250/234, 201.2  
See application file for complete search history.

(56) References Cited

U.S. PATENT DOCUMENTS

| | | | | |
|---|---|---|---|---|
| 5,811,828 A * | 9/1998 | Laser | ......................... | 250/566 |
| 6,431,452 B2 * | 8/2002 | Feng | ...................... | 235/472.01 |
| 6,801,260 B1 * | 10/2004 | Veksland et al. | ............. | 348/345 |
| 6,966,494 B2 * | 11/2005 | Nuebling | ................ | 235/462.36 |
| 6,981,642 B2 * | 1/2006 | Krichever | .................... | 235/454 |
| 7,026,606 B2 * | 4/2006 | Hecht et al. | .................. | 250/234 |
| 2003/0208125 A1 * | 11/2003 | Watkins | ....................... | 600/473 |
| 2004/0004125 A1 * | 1/2004 | Havens et al. | .......... | 235/462.22 |
| 2005/0092841 A1 * | 5/2005 | Barkan | .................. | 235/462.25 |
| 2005/0161509 A1 * | 7/2005 | Aizawa et al. | ......... | 235/462.37 |
| 2006/0038017 A1 | 2/2006 | Carlson et al. | | |
| 2006/0118635 A1 | 6/2006 | Joseph et al. | | |

* cited by examiner

*Primary Examiner*—Thien M. Le  
*Assistant Examiner*—April A Taylor

(57) ABSTRACT

The disclosed bar code reader includes an auto-focusing component for rapidly producing in focus images. An imaging system makes use of an aiming pattern that impinges upon the coded indicia of a target. The imaging system includes a light monitoring pixel array and a focusing lens that is fixed with respect to the pixel array for transmitting an image of the target object onto the pixel array. The imaging system also includes a movable mirror mounted for movement along a path of travel to reflect light passing through the focusing lens onto the pixel array. A drive motor moves the mirror relative the lens to adjust a focus of an image of the object formed at the pixel array. An automatic focusing component of the imaging system analyzes the aiming pattern reflected from the target object and projected onto the pixel array by the lens. The automatic focusing component issues commands to the drive motor causing the mirror to move along its path of travel to a suitable position for properly focusing the target object onto the pixel array.

13 Claims, 4 Drawing Sheets

COMPACT AUTOFOCUS BAR CODE READER WITH MOVING MIRROR

FIELD OF THE INVENTION

The present invention relates to an automatic focusing system for an imaging-based bar code reader.

BACKGROUND OF THE INVENTION

Various electro-optical systems have been developed for reading optical indicia, such as bar codes. A bar code is a coded pattern of graphical indicia comprised of a matrix or series of bars and spaces of varying widths, the bars and spaces having differing light reflecting characteristics. Systems that read and decode bar codes employing CCD or CMOS-based imaging systems are typically referred to as imaging-based bar code readers or bar code scanners.

Imaging systems include CCD arrays, CMOS arrays, or other imaging pixel arrays having a plurality of photosensitive elements or pixels. Light reflected from a target image, e.g., a target bar code is focused through a lens of the imaging system onto the pixel array. Output signals from the pixels of the pixel array are digitized by an analog-to-digital converter. Decoding circuitry of the imaging system processes the digitized signals and attempts to decode the imaged bar code.

The ability of an imaging system to successfully decode an imaged bar code is directly dependent upon the ability to move the lens to a suitable position whereby a satisfactorily clear image of the target bar code is focused onto the pixel array. The imaging system focusing lens is driven by a motor, such as a piezo motor, along an axis perpendicular to the pixel array or sensor plane to permit focusing of the bar code image on the pixel array.

Whether the imaging system is housed in a handheld, portable bar code reader or a permanently mounted reader, the user of the device cannot be expected to manually focus the imaging system by moving the lens, thus, there is a need for an automatic focusing system or auto focus system for an imaging system.

Bar code imaging systems require a variable focus optical system to maximize barcode reading range and deliver high quality images over a range of distances. The high scan rate for barcode reading imposes a high-speed requirement on the auto focusing technique to be used in the imaging system.

A typical two-dimensional barcode imaging scanner has an aiming pattern generator for the user to aim the scanner at the target and a separate illuminating system for illuminating the entire two-dimensional field of view. One auto-focusing technique that uses this aiming pattern is described in U.S. published patent application 2006:0038017 published on Feb. 23, 2006, which is assigned to the assignee of the present invention, and incorporated herein by reference in its entirety.

This above published application improves imaging quality through use of an auto-focus mechanism. Use of a moving lens tends to increase the device size. It is therefore desirable to create a compact auto-focus mechanism that does not appreciably increase device dimensions in relation to existing fixed focus imaging devices.

SUMMARY

The disclosed bar code reader includes an auto-focusing component for rapidly producing in focus images. The imaging system includes a light monitoring pixel array and a focusing lens that is fixed with respect to the pixel array for transmitting an image of a target object onto the pixel array. The imaging system also includes a movable mirror mounted for movement along a path of travel to reflect light passing through the focusing lens onto the pixel array. A drive motor moves the mirror relative the lens to adjust a focus of an image of the target object formed at the pixel array.

One exemplary automatic focusing component of the imaging system analyses an aiming pattern reflected from the target object and projected onto the pixel array by the lens. The automatic focusing component issues commands to the drive motor causing the mirror to move along its path of travel to a suitable position for properly focusing the target object onto the pixel array.

These and other objects advantages and features of the invention will become further understood from reference to the accompanying description of an exemplary embodiment of the invention when considered in conjunction with the accompanying drawings.

DETAILED DESCRIPTION

Figure 1:
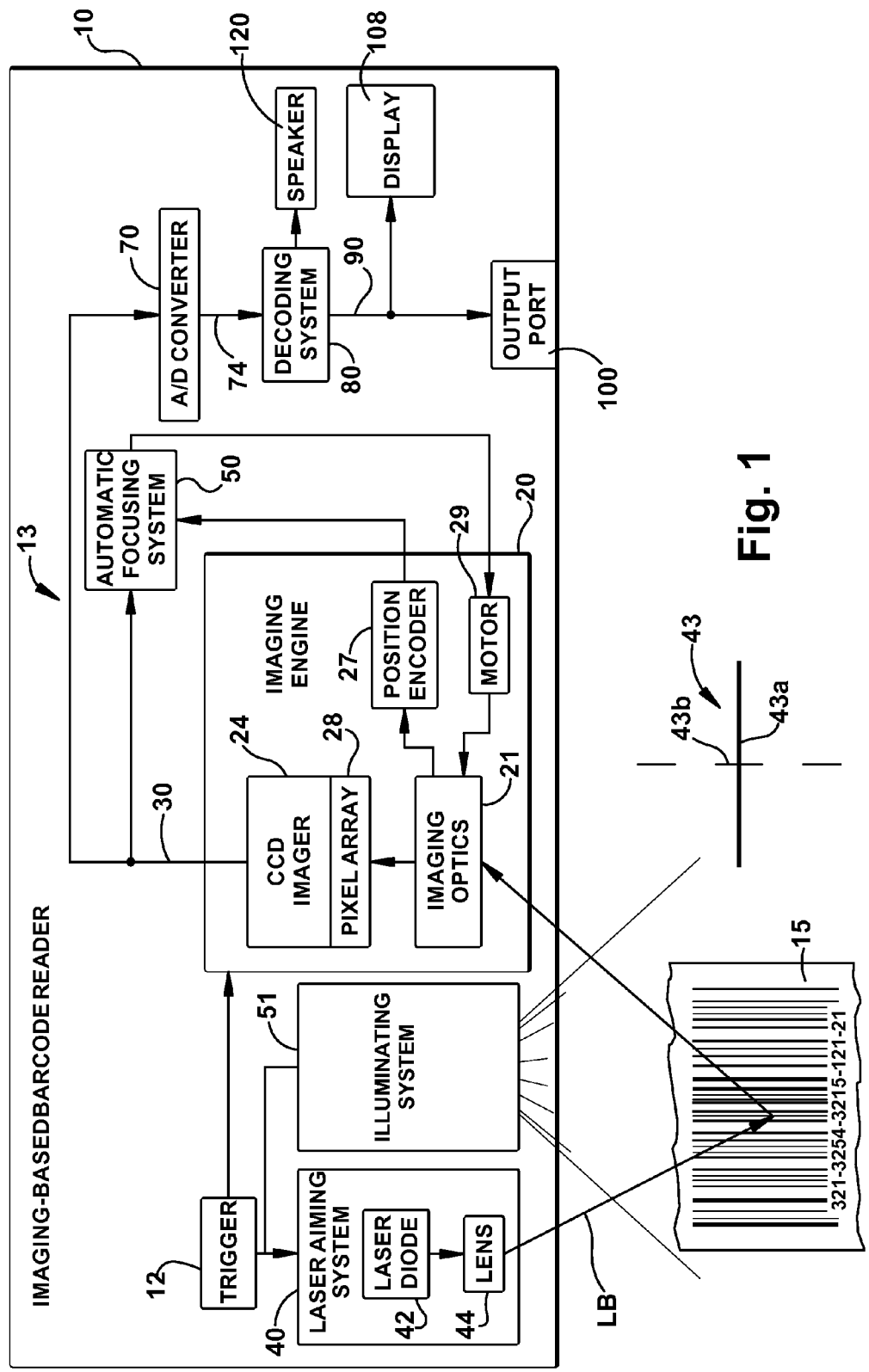
FIG. 1 is a schematic block diagram of an imaging-based bar code reader of the present invention having an automatic focusing system.
Figure 5:
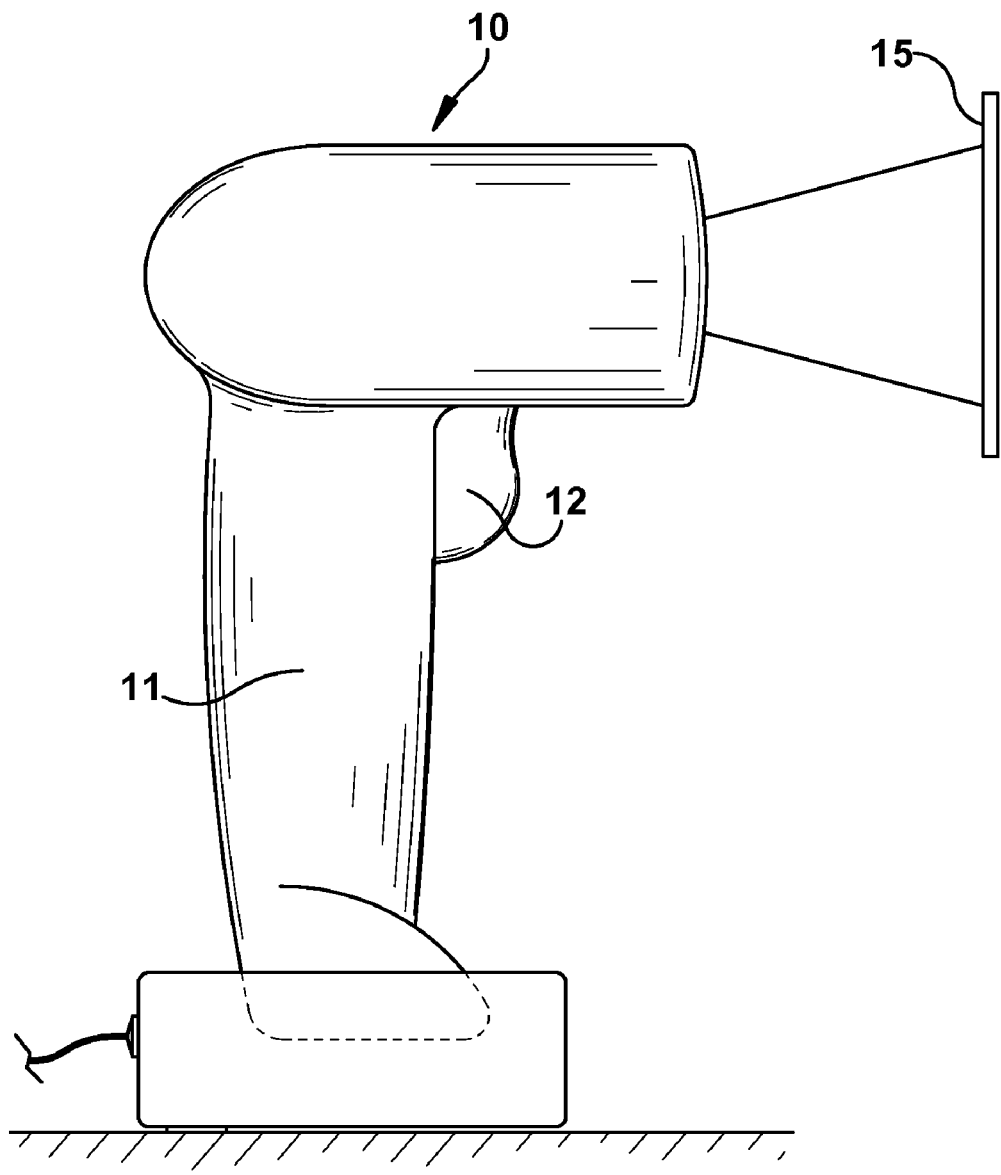
FIG. 5 is depiction of a housing for supporting the components depicted in FIG. 1.

A block diagram of an imaging-based bar code reader 10 is shown schematically in FIG. 1. The bar code reader 10, in addition to imaging and decoding both 1D and 2D bar codes and postal codes, is also capable of capturing images and signatures. In one preferred embodiment of the present invention, the bar code reader 10 is a hand held portable reader components of which are supported within a housing 11 (FIG. 5) that can be carried and used by a user walking or riding through a store, warehouse or plant for reading bar codes for stocking and inventory control purposes.

An auto-focus reader of the present invention, however, may be advantageously used in connection with any type of imaging-based automatic identification system including, but not limited to, bar code readers, signature imaging acquisition and identification systems, optical character recognition systems, fingerprint identification systems and the like. It is the intent of the present invention to encompass all such imaging-based automatic identification systems.

The bar code reader 10 includes a trigger 12 coupled to bar code reader circuitry 13 for initiating reading of a target bar code 15 positioned on an object when the trigger 12 is pulled or pressed. The bar code reader 10 includes an imaging component 20 including imaging optics 21 and a CCD imager 24.

A fixed lens (described in greater detail below) focuses light reflected from the target bar code 15 onto an array of photosensors or pixels 28 of the CCD imager 24. The pixels of pixel array 28 are read out generating an analog signal at an output 30 representative of an image of whatever is focused by the lens on the pixel array 28, for example, an image of the bar code 15. The analog image signal at the output 30 is then digitized by an analog-to-digital converter 70 and a digitized signal at an output 74 is decoded by decoder circuitry 80. Decoded data 90, representative of the data/information coded in the bar code 15 is then output via a data output port 100 and/or displayed to a user of the reader 10 via a display 108. Upon achieving a good "read" of the bar code 15, that is, the bar code 15 was successfully imaged and decoded, a speaker 120 is activated by the circuitry 13 to indicate to the user that the bar code has been successfully read.

Figure 2:
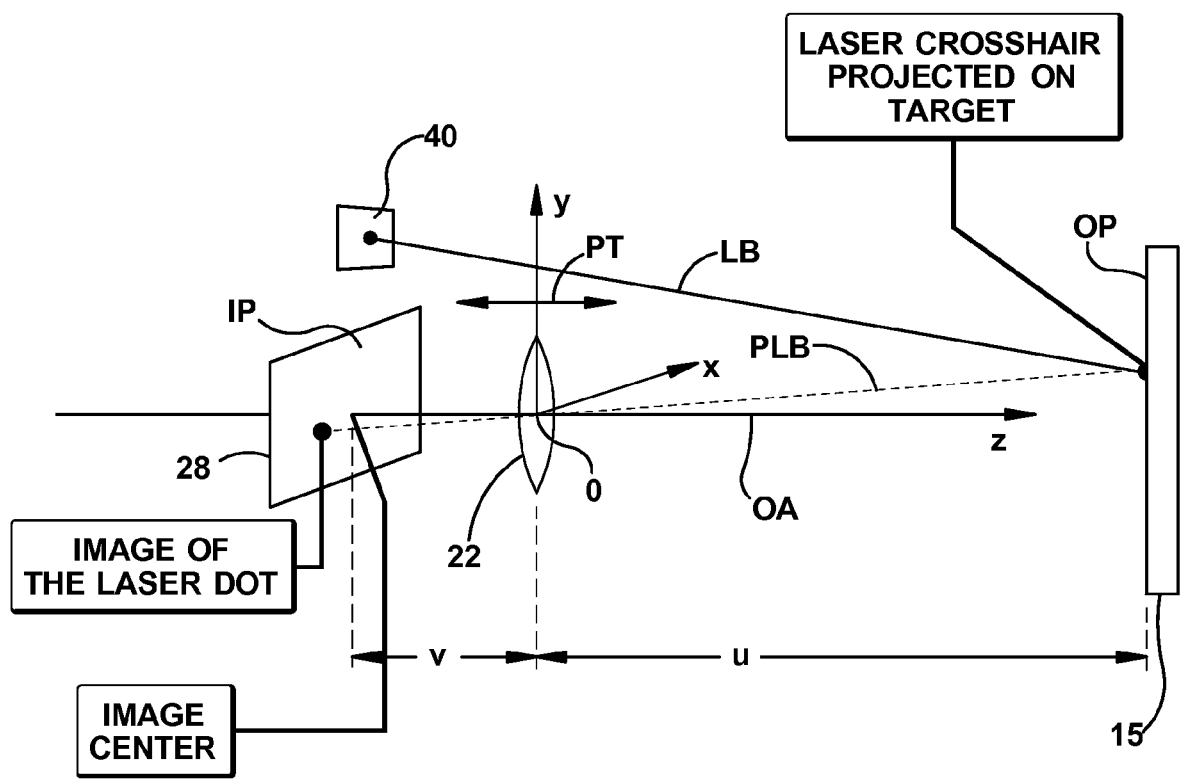
FIG. 2 is a schematic view of a prior art automatic focusing system.

FIG. 2 illustrates a prior art optics system that includes a moving focusing lens 22 is driven by a motor such as a piezo motor, along its linear path of travel PT. The lens path of travel PT is along an optical imaging axis OA and orthogonal to a light receiving planar surface of the pixel array 28. It should be recognized that the lines labeled PT in FIG. 2 is a schematic representations of the path of travel of the lens 22 and the lines merely illustrate the direction of the lens path of travel along the optical axis OA. Additional details are disclosed in United States published application 2006:0118635 A1 which is incorporated herein by reference.

Returning to FIG. 1, the reader 10 further includes an aiming pattern generator 40 that generates a visible aiming pattern 43 to aid the user in properly aiming the reader at the target bar code 15. In one preferred embodiment, the aiming generator 40 is a laser aiming apparatus. Alternatively, the aiming apparatus 40 may utilize an LED or another source of illumination known to those of skill in the art. The pattern 43 may be a pattern comprising a crosshair formed from a thick horizontal line 43a and a perpendicular thin vertical line 43b. In one preferred embodiment, the laser aiming apparatus 40 includes a laser diode 42 and a diffractive lens 44. In one embodiment, in addition to the aiming pattern generator 40, the reader 10 includes a separate illumination system 51 for shining illumination light onto the target bar code 15.

Imaging Optics

Figure 3:
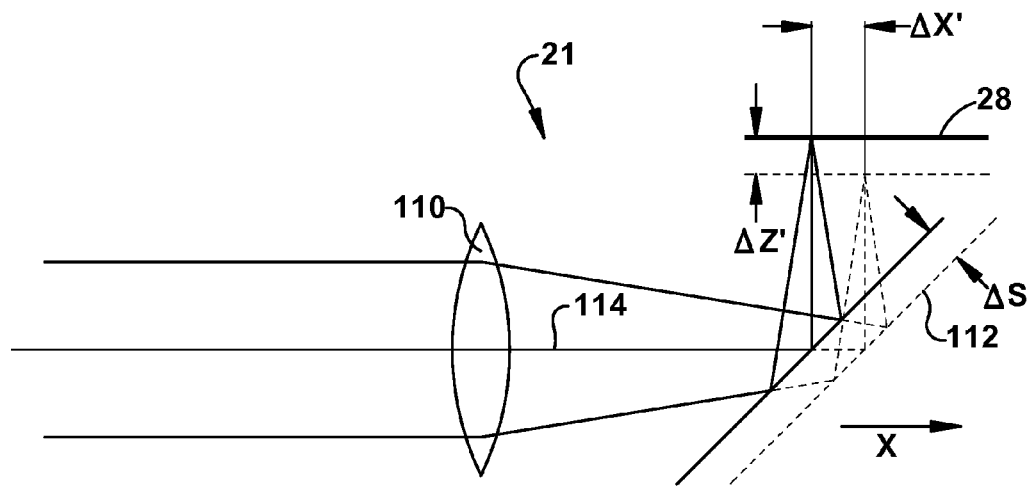
FIG. 3 is schematic diagram of an focusing optics of the bar code reader of FIG. 1.
Figure 4:
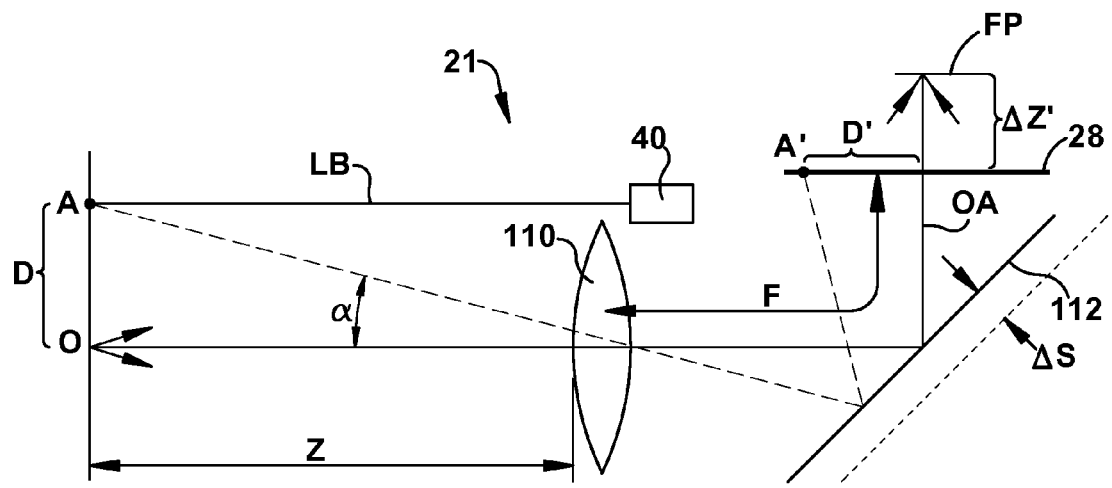
FIG. 4 is an alternate schematic diagram of an focusing optics of the bar code reader of FIG. 1.

FIGS. 3 and 4 depict alternate embodiments of the imaging optics 21 that make use of the aiming pattern 43 that impinges upon and illuminates a portion of the coded indicia of the target 15. The monitoring pixel array 28 and a focusing lens 110 are fixed with respect to each other. Note, although one lens 110 is depicted in the drawings, this lens can be made up of multiple lenses having an effective focal length derived from the focal lengths of the individual lenses. The imaging optics 21 also includes a generally planar mirror 112 mounted for back and forth movement along a path of travel in a direction other than along the mirror surface so that the mirror shift has a component $\Delta S$, for example, the mirror can be moved along or perpendicular to the axis of the lens to reflect light passing through the lens 110 onto the pixel array 28. A drive motor 29 moves the mirror relative the lens in the 'x' direction to adjust a focus of an image of the object formed at the pixel array. The illustrated mirror 112 is oriented at an angled of 45 degrees with respect to an optical axis 114.

A rightmost position of the mirror as depicted in FIG. 3 is located at a position at which the mirror 112 will correctly focus incoming light onto the sensor or pixel array 28 from an object at the largest distance spaced from the reader within the reader's working range. At distances greater than this outer limit the reader cannot discern information of a typical bar code.

The automatic focusing system 50 analyzes the aiming pattern within an image of the beam reflected from the target object and projected onto the pixel array by the lens. The focusing system 50 issues commands to the drive motor 29 to move the mirror along its path of travel to a suitable position for conveying a properly focused image of the target object onto the pixel array.

A focus change is obtained by shifting the mirror 112 to an appropriate position resulting in a change in the optical distance between the lens and the pixel array 28 thereby adjusting the focusing of the image. Assume the solid line depiction of the mirror properly focuses the image. A mirror shift $\Delta S$ (shown in FIG. 3) causes an image at the extreme limit of the reader's working range to be defocused to a modified image plane (behind the pixel array 28) by $\Delta Z'$ and shifted to the side by $\Delta X'$. With the mirror oriented at forty five degrees to the lens axis 114, $\Delta Z' = \Delta X' = 1.4 * \Delta S$. The defocus $\Delta Z'$ can be used to obtain a sharp image (for objects at other object distances within the working range of the reader) on the pixel array 28. The image displacement $\Delta X'$ is easily discernible by the reader and can be used to monitor the mirror shift in an open loop system that includes a position encoder 27 and the motor drive 29.

In one embodiment of the imaging optics of FIG. 3, the mirror 112 can be moved until obtaining a sharp image of the aiming pattern 43 using known image processing techniques. This focus analysis determines a suitable position for the mirror. Using this focus analysis, multiple frames or images of the pattern are read out from the pixel array 28 at different mirror positions. The images are analyzed for image clarity by the automatic focusing system 50 and a suitable position for the mirror 22 is determined. Movement of the mirror from the home or rightmost position (FIG. 3) along its path of travel is determined via a search routine or heuristic which seeks a satisfactory focus position.

To speed up the auto-focusing performed by the reader 10, a range finding technique can be utilized by the automatic focusing system. This technique can be based, for example, based on the processes described in aforementioned published applications 2006:0038017 and 2006:0118635 A1 which are incorporated herein by reference. This assumes image focusing can be accomplished quickly enough so that the object distance is assumed to be fixed even though the reader is hand held and subject to movement by the user.

Based on the determined separation between object and lens using the aforementioned rangefinder, the automatic focusing control 50 moves the mirror 112 to defocus by a proper amount, the focusing system uses the relation $\Delta Z'$ ($\approx F^2/Z$) to determine the proper shift. In this relation F is the lens effective focal length, and Z is the target distance to the lens. By monitoring the image shift on the pixel array of the target and using a feedback loop, the focusing system 50 directs the control motor 29 to move the mirror until the mirror shift correlates with the 'in focus' image relation. As an example, assume the distance between the object and lens to be 100 mm; then if the lens effective focal length (EFL) is 4.5 mm, the mirror has to be shifted by $(4.5)^2/100 = 0.2$ mm. The the object is at a distance of 500 mm from the lens, the mirror has to be shifted by 0.04 mm.

The image on the sensor is most effectively the aiming pattern 43, so that the focusing can be performed without capturing the whole image during mirror adjustment. Stated another way, the controller need only be concerned with monitoring shifts in the aiming pattern without object illumination by activating the illuminating system 51 nor concern with the bar code contents.

FIG. 4 illustrates an alternate embodiment of the imaging optics that is self calibrating and automatically centers the system field of view on the aiming spot. The aim pattern with parallax D is used. The laser aiming system 40 is positioned with respect to the lens 110 to cause the crosshairs of the pattern 43 to be spaced a fixed or constant distance D from the optical axis OA of the lens 110. For relatively large object distances Z, the angle $\alpha$ is given by D/Z. A sharp focus on the sensor 28 is achieved when the sensor is located at a distance $\Delta Z'$ ($\approx F^2/Z$) from the lens focal plane FP (F—the lens effective focal length, Z—the target or object distance to the lens). The distance D' of the image A' of the aiming spot crosshairs from the system optical axis OA can be calculated As D'=D*F/Z.

If D=F then the required defocus is equal to the spot shift from the optical axis; ΔZ' approximately equals D'. When using the mirror shift ΔS for the focus compensation, if the mirror is installed at forty five degrees with respect to the optical axis, the image shift is equal to the introduced defocus. Therefore, the system can be brought to sharp focus by simply moving the mirror until the image A' of the aiming spot is shifted to the system optical axis. Simultaneously, the imaging field of view is centered on the aiming spot; therefore, there is no parallax between the aiming spot and the imaging field of view.

Small amplitude oscillations of the mirror, with the depth of focus, cause lateral oscillations of the image. This aspect of operation can be used by the reader for super resolution, i. e. to reduce the effective pixel size. Depending on the design constraints and desired range finding performance, one understanding the art of optical design and the spirit of the invention can design a system where the aiming axis is not parallel to the lens axis and/or the parallax D is not equal to the lens EFL, and/or the mirror is not located at a 45 degree angle to the lens axis.

Laser Ranging

The laser light emitted by the laser diode 42 to generate the laser aiming pattern 43 travels outwardly toward the target bar code 15. The laser beam impacts the bar code 15 or the object the bar code is affixed to and is reflected back toward the reader where it is focused on the pixel array 28 by the lens 110. Laser ranging utilizes the laser aiming apparatus 40 to determine an object distance u (shown in FIG. 2) between a principal plane PP of the lens 22 shown in FIG. 2 and the object plane OP, that is, a surface of the target bar code 15, along the optical axis OA. The object distance u is computed using a parallax distance algorithm.

Using geometric relationships, the parallax distance algorithm determines the object distance u. Given that the object distance u has been determined and further given that the focal length f of the lens is known, the image distance v can be computed using the standard lens equation (Thin Lens law) 1/f=1/u+1/v. The image distance v is the distance between the principal plane PP of the lens 22 and the image plane IP, that is, a light receiving surface of the pixel array 28. The automatic focusing component 50 then moves the lens mirror along its path of travel to a suitable position such that a satisfactory image of the laser aiming pattern 43 is focused onto the pixel array 28.

The goal of the auto focusing system 50 is to bring the image into focus prior to image capture of the entire bar code. The depth of field of the imaging system 20 permits imprecision in the range measurement.

Locating the Aiming Pattern 43

The essence of laser ranging is locating the center of the aiming pattern 43 which is located at the intersection of the thick horizontal line 43a and the thin vertical line 43b and monitor its movement as the mirror moves. Considering the image of the laser beam is highly blurred when the mirror position produces an out of focus image, it is necessary for the automatic focusing system 50 to identify a region of interest (ROI) of the laser spot, i.e., the region where the aiming pattern 43 lies and its blurred peripheral and compute the center of mass (COM): X=i .times. i*I .function. (i) i .times. I .function. (i), (22) where i indicates the x coordinate of the pixels within the ROI and I(i) their corresponding intensity. The same applies to the Y coordinate.

A detailed theoretical analysis of the COM computation is presented in an article entitled "Novel Denoising Algorithm for Obtaining a Superresolved Position Estimation" by Z. Zalevsky, et al., Opt. Eng., 41(6), pp. 1350-1357, June 2002. The foregoing article is incorporated in its entirety by reference herein. The process used by the automatic focusing system 50 for locating the center of the aiming pattern is illustrated in the above two published patent applications.

The CCD or CMOS sensors that make up the imager 24 sense light reflected back from the target surface and form pixel data corresponding to an image of the target. It is advantageous to use an array sensor that has the capability to output a portion of pixels upon request, so that the transfer time and processing time can be shortened when only a portion of the array is properly exposed. One such sensor is a CMOS array made by Micron having part number MT9M001. The pixel data from the array is converted into digital data by an A/D converter 70 that is decoded by decoding system 80. An output port or display 108 provides the results of decoding to a peripheral device (not shown) or displays them to the user. The scanner 10 also includes an illumination source (not shown) that is capable, within a prescribed scanner range, of illuminating a portion of the target surface sufficient to fill the entire two-dimensional array of sensors with data. The scanner includes an aiming pattern generator 40 that includes one or more laser diodes 42 and a focusing lens 44 (see FIG. 1) that is activated by a user actuated trigger 12.

While the present invention has been described with a degree of particularity, it is the intent that the invention includes all modifications and alterations from the disclosed design falling with the spirit or scope of the appended claims.

The invention claimed is:

1. An imaging based barcode reader for imaging a target comprising:
    an imaging system that includes a light monitoring pixel array,
    a focusing lens fixed with respect to the pixel array to transmit an image of a target object to the pixel array;
    a mirror mounted for movement along a path of travel to reflect light passing through the lens onto the pixel array;
    a drive for moving the mirror relative the lens to adjust a focus of an image of the target object formed at the pixel array;
    an aiming pattern generator that emits an aiming pattern to impinge upon and illuminate a portion of the target object; and
    an automatic focusing component for analyzing the aiming pattern reflected from the target object and projected onto the pixel array by the lens and moving the mirror along its path of travel to a suitable position for properly focusing the target object onto the pixel array; and
    wherein the automatic focusing component comprises means for identifying a position of the aiming pattern on the pixel array and activating the drive to move the mirror until the position of the aiming pattern on the pixel array is moved to a predetermined position.

2. The reader of claim 1 wherein the mirror is angled with respect to the pixel array at approximately a forty five degree angle.

3. The reader of claim 1 wherein the mirror moves along a generally linear travel path.

4. The reader of claim 1 additionally comprising a handheld housing that can be manipulated by a user to position the aiming pattern with respect to indicia on the target.

5. The reader of claim 1 wherein the automatic focusing component comprises:
a motor drive for moving the mirror and a position encoder for determining a position of the mirror with respect to the lens as the motor drive moves the mirror.

6. The reader of claim 1 wherein the automatic focusing component comprises means for identifying a position of the aiming pattern on the pixel array and activating the drive to move the mirror until the position of the aiming pattern on the pixel array is centered on an optical axis of the lens.

7. A method of focusing an image of a target object on an imaging system of an automatic identification system including an imaging pixel array comprising:
orienting a focusing lens to transmit light from the target object;
reflecting light passing through the focusing lens from the target object onto the imaging pixel array by positioning a mirror to intercept light passing through the focusing lens and redirecting said light to the imaging pixel array;
forming an aiming pattern at a plane of a target object and;
adjusting a focus of the reader for the target object imaging by moving the mirror to adjust a light path distance between the imaging pixel array and the focusing lens; and
wherein the focus of the aiming pattern is adjusted until an image of the aiming pattern on the imaging pixel array is moved to a predetermined position.

8. The method of claim 7 wherein the image of the aiming pattern is moved to a position centered along the optical axis of the lens as bent by the mirror.

9. The method of claim 7 wherein the focus is adjusted by moving the mirror along the path of travel to a suitable position for properly focusing the target object onto the pixel array.

10. The method of claim 7 wherein multiple images of the target object are formed based on multiple mirror positions and comparing a focus of the multiple images to determine a best mirror position.

11. The method focusing an image of claim 7 additionally comprising collecting data indicative of an image reflected back from an illuminated portion of the target object and decoding indicia on the target object based on the collected data from the portion of the indicia that is illuminated.

12. An imaging based barcode reader for imaging a target object comprising:
imaging means for forming an image on a light monitoring pixel array,
focusing means fixed with respect to the pixel array for transmitting an image of a target object to the pixel array;
reflection means mounted for movement along a path of travel for reflecting light subsequent to the focusing means onto the pixel array;
drive means for moving the reflection means and adjusting a focus of an image of the target object formed at the pixel array;
means for generating an aiming pattern that emits an aiming pattern to impinge upon and illuminate a portion of a coded indicia;
automatic focusing means for analyzing the aiming pattern reflected from the target object and projected onto the pixel array and moving the reflection means along its path of travel to a suitable position for properly focusing the target object onto the pixel array; and
the automatic focusing means comprises means for identifying a position of the aiming pattern on the pixel array and activating the drive to move the mirror until the position of the aiming pattern on the pixel array is is moved to a predetermined position.

13. The reader of claim 12 wherein the automatic focusing means comprises means for identifying a position of the aiming pattern on the pixel array and activating the drive to move the mirror until the position of the aiming pattern on the pixel array is centered on an optical axis of the focusing means.

* * * * *